United States Patent [19]

MacLaughlin

[11] Patent Number: 4,580,062
[45] Date of Patent: Apr. 1, 1986

[54] SAFETY SHIELD CONTROL DEVICE

[75] Inventor: Donald N. MacLaughlin, Midland, Mich.

[73] Assignee: Cosden Technology, Inc., Dallas, Tex.

[21] Appl. No.: 487,379

[22] Filed: Apr. 21, 1983

[51] Int. Cl.$^4$ ............... H01H 19/64; G08B 13/08; G01R 17/02
[52] U.S. Cl. .................... 307/113; 307/116; 307/328; 340/547; 340/644; 324/98; 324/219; 361/180; 361/193
[58] Field of Search ............. 361/88, 189, 180, 193, 361/171, 172; 307/113, 116, 326, 328; 340/547, 644, 660; 335/206; 324/98, 219

[56] References Cited

U.S. PATENT DOCUMENTS

| | | | |
|---|---|---|---|
| 3,813,663 | 5/1974 | Perkins | 361/172 X |
| 3,825,920 | 7/1974 | Nelson et al. | 324/98 X |
| 3,864,173 | 2/1975 | Butschkan | 335/206 X |
| 4,335,376 | 6/1982 | Marquardt | 340/547 |
| 4,349,814 | 9/1982 | Akehurst | 335/206 X |
| 4,420,745 | 12/1983 | Dray et al. | 324/98 X |

Primary Examiner—Harry E. Moose, Jr.
Assistant Examiner—Derek S. Jennings
Attorney, Agent, or Firm—Schwartz, Jeffery, Schwaab, Mack, Blumenthal & Evans

[57] ABSTRACT

An electrical interlock to prevent unauthorized access to potentially hazardous equipment and an associated detection circuit to detect if a safety shield or closure member is open, not securely closed or has been tampered with and to thereupon automatically de-energize the equipment. The detection circuit may comprise a balanced bridge incorporating the electrical interlock into a leg thereof and may also provide a visual or audible indication whenever the bridge is unbalanced thereby indicating an improperly closed safety shield.

13 Claims, 3 Drawing Figures

SAFETY SHIELD CONTROL DEVICE

BACKGROUND OF THE INVENTION

1. Field of the Invention

The present invention relates to automatic personal protection devices and more particularly to electronic lockout devices to prevent user interference with protection barrier safety devices.

2. Background and Prior Art

Many industrial and consumer machines perform operations such as stamping, cutting, spinning, milling, welding, etc. which present potential dangers to users. An example of such a machine is a spin welder for container sections such as that disclosed in U.S. Pat. No. 3,800,400 to Mistarz et al. wherein a plurality of gears, rotating wheels, spinning shafts, etc are utilized. If loose clothing is caught in such a device or if an operator's hands, eyes, etc. have direct access to the moving equipment while it is in operation, a hazard is created which can result in serious injury. It is therefore common on such equipment to utilize a protective shield or other lockout device to prevent direct access to the dangerous areas of the operating equipment. Such a shield can be in the form of a hinged door which, when closed, effectively blocks operating personnel from deliberately or accidentally interfering with operating equipment. In order to be effective, such door shields are usually provided with some sort of a lockout switch which controls power to the equipment. If the door or shield is not securely closed, the switch will prevent the equipment from operating. Known switches for this purpose can be contact operated switches (e.g. microswitch), magnetically operated switches (e.g. reed switch) or the like and can be normally opened or normally closed depending upon the configuration of the associated circuitry for operating the equipment. Also known are radio-frequency (rf) guards which utilize an rf loop and an antenna. If any capacitance, such as an operator's hand, is positioned between the loop and the antenna, it will be sensed by the antenna which will shut down the equipment.

In connection with such safety shield and electrical interlocks, problems may arise if the operator of the equipment deliberately attempts to defeat the electrical interlock. For example, should the electrical interlock switch malfunction or become misaligned with its closure member, maintenance personnel may attempt to remedy the problem by positioning a magnet near the switch (if it is magnetically activated) or by simply "jumping" any contact operated switch. RF switches can be similarly defeated. Similar measures can also be taken if the operator, for any reason, deliberately attempts to operate the equipment without the safety system provided. Thus, one of the major problems with prior art safety systems is the relative ease with which it can be defeated by operator personnel.

SUMMARY OF THE INVENTION

It is therefore, an object of the present invention to provide an equipment safety system which cannot be readily defeated by user personnel.

It is a further object of the present invention to provide a safety switch lockout which can only be nullified by authorized personnel.

It is a still further object of the present invention to provide a circuit to prevent the use of any equipment with a malfunctioning or missing safety shield or a machine wherein the safety shield had been subject to tampering.

To achieve the foregoing and other objects of the present invention, as embodied and broadly described herein, the safety shield control device of the present invention may comprise an encoded switch which cooperates with a decoder member on the equipment whenever the safety shield or closure member is not securely in place. Preferably the encoder comprises a group of two or more encapsulated switches such as reed switches. The pattern arrangement of the switches is not visible to the user. A separate encoder/decoder switch is preferably provided for each shield or closure on the machine. Preferably the encoder is positioned on a stationary portion of the machine and when the shield is securely latched the decoder will be properly positioned to activate the switch assembly. Each encapsulated encoder may also be provided with a precision resistor network whose value is unknown to the user. The total resistance of the precision resistors from each encoder will then preferably form one leg of a balanced bridge circuit. Only when all the closures or shields are securely closed will the bridge be balanced to enable an output signal which, either directly or through a control circuit functions to energize the associated equipment.

Thus, a safety system is provided which is not user defeatable and which provides operator safety and proper equipment maintenance.

BRIEF DESCRIPTION OF THE DRAWINGS

The accompanying drawings, which are incorporated in and form a part of the specification, illustrate an embodiment of the present invention and, together with the description, serve to explain the principles of the invention.

DETAILED DESCRIPTION OF THE PREFERRED EMBODIMENT

Figure 1:
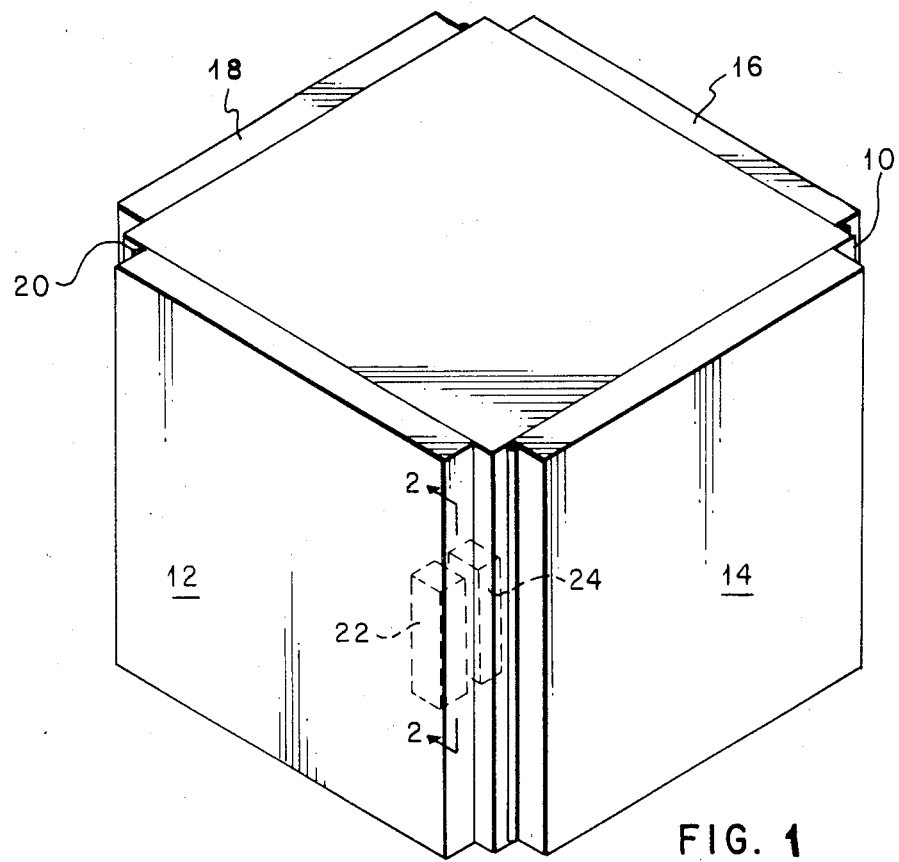
FIG. 1 is a perspective view of a safety device equipped with a series of shields each of which has an electrical interlock.

Reference will now be made in detail to the present preferred embodiment of the invention, an example of which is illustrated in the accompanying drawings. Turning first to FIG. 1 there is depicted a representation of an item of equipment 10, such as a spinwelder or the like, which includes moving, spinning, cutting, welding or other such elements (not illustrated) or which otherwise presents potential user hazards when in operation. In order to prevent user access safety shields 12, 14, 16 and 18 are provided. The shields may of course assume any convenient configuration consistent with the shape and functions of the equipment 10. The movable shields 12–18 may be made of shatterproof plastic or any such suitable material. As will become apparent from the description below, where encoded reed switches and decoder magnets are utilized as a safety interlock, ferric metal should not be used for the shield members. Where more than one shield is used, a separate electrical interlock will preferably be provided for each shield. The shields may be conveniently arranged to pivot open about a hinge 20 for easy access to the inside of the equipment 10 as necessary.

Each shield is preferably provided with an electrical interlock 22, 24 which will be further described in connection with FIG. 1A wherein elements corresponding to those in FIG. 1 are similarly numbered. The circuit elements in FIG. 1A are exaggerated for clarity and the size, shapes and relative position of the devices depicted should not be construed to represent those of the actual device.

An encoded switch, 24 is provided on the equipment 10 such as on a structural post of a spinwelder. The switch 24 cooperates with a decoder magnet arrangement 22 on a shield. While the encoder section is shown on the stationary element and the decoder on the movable shield, it will be apparent to the artisan that the configuration can be reversed. Since the encoder 24, as explained below, may be connected to additional equipment through terminals A and B, it is preferable to position it on the stationary (i.e. equipment 10) side.

Figure 1A:
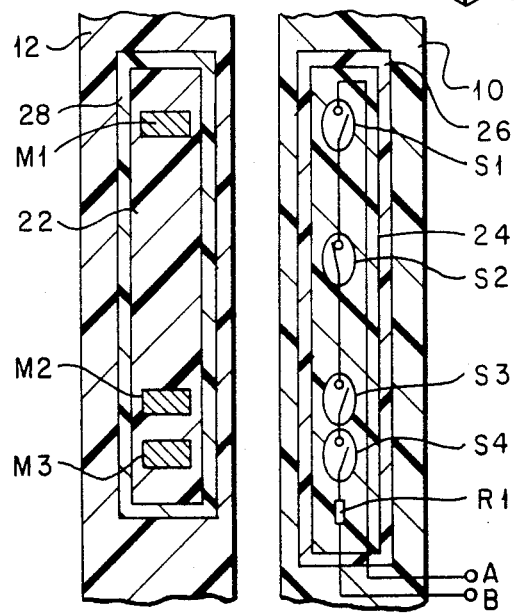
FIG. 1A is a fragmentary, sectional view of a safety shield electrical interlock showing an exemplary encoder and decoder.

As exemplified by FIG. 1A, the encoder preferably contains three or more reed switches, S1–S4. In addition, the encoder is preferably encapsulated or potted within an opaque mounting case 26. Therefore, the arrangement of the switches is not visible to the equipment user.

The decoder, or activating magnetic bar 22, like the encoder, is encapsulated in an opaque casing 28. The magnet bar is coded with the same arrangement as the encoded switches. The pattern of the magnets M1–M3 is not visible. The reed switches are selected to be of appropriate sensitivity and the magnets are small enough so that only the decoder bar 22 which is keyed to the encoder 24 will operate to close the normally open switches S1, S3 and S4 to complete the circuit between terminals A and B when the shield 12 is placed in proximity with the equipment 10.

A common problem with prior art single element switches is that they can be bypassed with a loose magnet such as the type commonly carried in the pockets of maintenance personnel. The magnetic code of the present arrangement is not known to such personnel and so the interlock cannot be easily defeated.

In order to discourage efforts to defeat the interlock by placing a magnet over the encoder 24 which is large enough to cover the entire case, a normally closed reed switch S2 may be provided. This switch is arranged to open, and therefore maintain the interlock, if such an attempt is made to defeat the system.

In addition, a precision resistor R1 may be encapsulated into the encoder 24 in order to defeat any attempt to bypass the switch assembly by shorting it out. The interfacing system, as described below, may be made responsive to the value of the resistance. The value of the precision resistor R1 should be known only to the equipment manufacturer or authorized operator personnel.

As should now be apparent, any attempt to bypass the encoder switch assembly or to disconnect it from the system will result in an open circuit across terminals A–B when the system is energized. An open circuit will also result if any door is opened. Only when the encoder and decoder have not been tampered with and the safety shield is securely closed and aligned with the equipment 10, will the terminals A–B have the proper resistance or signal thereacross.

Figure 2:
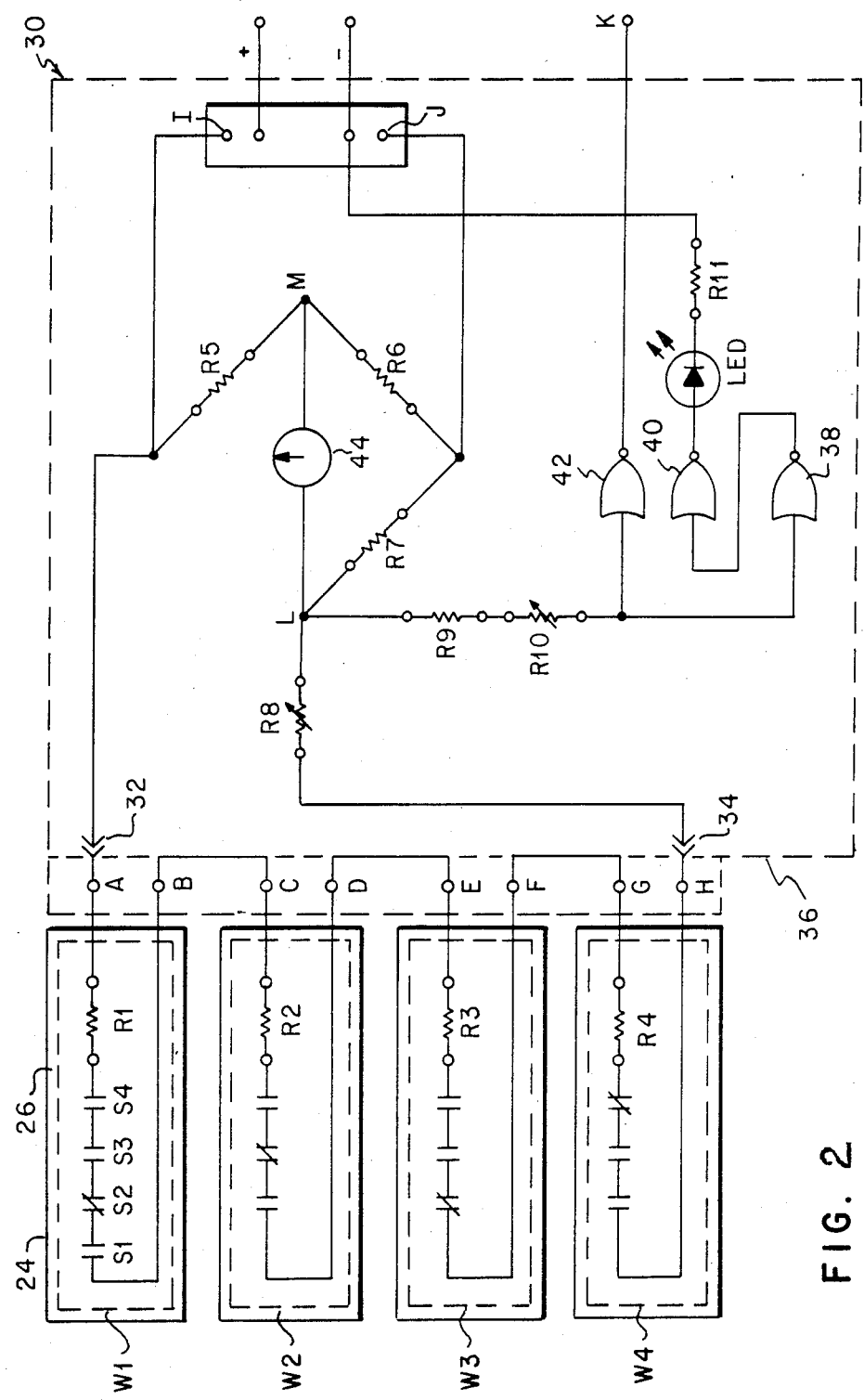
FIG. 2 is a schematic diagram indicating an encoding switch arrangement and a balanced bridge detecting circuit.

Preferably, the encoder/decoder switch system described above is used in connection with a circuit which can detect when a shield is opened or when the system has been tampered with. Such a system may be of the type shown in FIG. 2. In the example of FIG. 2, the equipment is provided with four shields or windows W-1 to W-4. Each shield may have an encoder 26. These encoders may be identical or, as shown in FIG. 2, may be different from each other with regard to the number of switches used, the placement of the switches, the values of the precision resistors (R1–R4 in FIG. 2) or other such variations as would suggest themselves to the artisan. Preferably each encoder presents only a single terminal pair from its potted enclosure. These correspond to terminals A–B, C–D, E–F and G–H in the example shown. The encoders are preferably connected in series thereby presenting a single terminal pair A–H to the detection circuit 30.

In the embodiment shown the detection circuit includes a balanced bridge comprising resistors R5, R6, R7 respectively on three of the four legs and the combination of the switch assemblies connected across terminals A–H on the other leg. When all of the shields W-1 to W-4 are closed, the bridge is balanced and no bridge output signal is generated. A zero bridge signal results in a steady output voltage being provided across terminals I–J of the bridge. Preferably, the connection between the switch assemblies and the balanced bridge, indicated at 32 and 34, is not accessable to be bypassed or diagnosed by the user. The entire bridge circuit is potted in an opaque material and preferably comprises an epoxy encapsulated printed circuit card 36 which prevents circuit diagnosis. Removal of the card 36 by the user will not defeat the interlock system since such removal will result in a zero output across terminals I–J and therefore disable the equipment.

Adjustable resistor R8 is provided so that the total resistance of the leg of the bridge containing the encoder(s) can be balanced in accordance with the number of encoders used.

Resistors R9 and R10 are included to provide sensitivity adjustment so that small excursions in line power will not act to trip the system and give a false indication of an open or misaligned safety shield. Essentially resistors R9 and R10 function to adjust the level at which the logic chip (as further described below) will trip.

For each equipment application, the balance adjustment R8 and sensitivity adjustment R10 are preferably factory set utilizing board potentiometers that are epoxy sealed after calibration. Any attempt to unseal them will therefore destroy the printed circuit card and disable the equipment.

The sensitivity adjustment, R10, is connected to a logic chip which indicates when a shield is open or ajar or when the system has been tampered with.

Gates 38 and 40 represent NOR gates. This configuration of double NOR gates is used as a signal buffer for low level switching. It should be appreciated that the double NOR gate is the logical equivalent of a single AND gate with its inputs tied and can be replaced by such an AND gate. In those applications where current drain from the bridge circuit to the light emitting diode, LED and its current limiting resistor R11 are not significant, the double NOR gate can be eliminated altogether.

In operation, whenever the bridge circuit is unbalanced, the normally 0 input to gate 38 will go to a logical 1 which is imposed on the input to gate 38. Thus, the output of gate 38 goes to 0 which is imposed on NOR gate 40. The normally 0 output of gate 40 then goes to 1 which acts to illuminate the LED, indicating that the bridge is unbalanced. As mentioned above, this may be due to an open or unsecured shield or to tampering.

The NOR gate 42 merely functions as a voltage level sensor to sense the voltage across the bridge and provide an output at K depending upon the sensed voltage. As will be appreciated by the artisan, this gate could be replaced by a reverse biased transistor or other well-known voltage level detector. In operation, the gate 42 provides overvoltage detection and may be connected to an automatic shut-off device or to a master control device for controlling the equipment 10.

The bridge is energized through terminal I-J which is connected to a regulated DC power supply, preferably of a low voltage such as 12 V DC. A balancing volt meter 44 may be provided if desired across bridge terminals L-M to monitor the bridge signal.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the system may be used with door or windows which are not associated with equipment but which enclose a space to be protected, for example a room, home, store or other installation. The system may also be useful to align cooperating members or the like. The LED can be replaced by or supplemented with an enunciator such as an alarm or buzzer. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed:

1. An interlocking switching system comprising:
   (a) an encoder potted in a generally opaque potting substance and having a pair of terminals and a plurality of reed switches positioned at predetermined locations and connected to form a circuit between said terminals, said plurality of reed switches comprising at least one normally open reed switch and at least one normally closed reed switch;
   (b) a decoder potted in a generally opaque potting substance and having a plurality of magnets positioned at locations corresponding to said predetermined locations whereby when said encoder and decoder are brought into proximity with each other, said magnets are operable to form an electrically conductive path having a predetermined impedance between said terminals by closing said at least one normally open reed switch, and by not opening said at least one normally closed reed switch;
   (c) a detection circuit wherein said predetermined impedance of said encoder further comprises at least one precision circuit element in said potted circuit to cooperate with said detection circuit; and,
   (d) a safety shield associated with said decoder for preventing a user of equipment from accessing potentially hazardous portions of said equipment, and wherein said encoder is associated with a portion of said equipment in juxtaposition with said shield.

2. The switching system of claim 1 wherein said precision circuit element is a resistor and said detection circuit comprises a balanced bridge circuit, wherein said resistor comprises at least a portion of one leg of said bridge circuit.

3. The switching system of claim 2 wherein said detection circuit further includes an indicator element connected in the bridge for indicating when said bridge is unbalanced.

4. A detection circuit for equipment having a moveable closure members, said detection circuit providing an indication when at least one of said closure members is not securely closed comprising:
   (a) an associated encoder comprising a plurality of switches and at least one precision resistor;
   (b) a bridge circuit having four legs, one of said legs comprising said encoder;
   (c) circuit means to energize said bridge;
   (d) an indicator to provide an indication whenever said bridge is unbalanced;
   (e) a decoder carried on said at least one of said closure members and keyed to said encoder; and
   (f) a balancing adjustment for balancing said bridge circuit in accordance with the number of closures utilized.

5. The detection circuit of claim 4 further comprising a voltage detector connected to said bridge circuit, said voltage detector, when activated, generating a signal to automatically deactivate said equipment.

6. The detection circuit of claim 4 wherein said plurality of switches of each of said encoders are arranged according to a predetermined pattern and each of said decoders comprise switch activating devices arranged in a pattern to activate said associated encoders and wherein each of said encoders and associated decoders are individually potted in an opaque potting material whereby said patterns are not visible.

7. The detection circuit of claim 6 wherein said bridge circuit is mounted on a printed circuit card and, after said balancing adjustment is made, said circuit is encapsulated in an opaque potting material.

8. The detection circuit of claim 6 wherein each of said plurality of switches comprise normally open switches which are closed by said activating device and wherein each of said encoders further comprises at least one normally closed switch, said decoder being operable to maintain said at least one normally closed switch in a closed position when closing said normally open switches.

9. The detection circuit of claim 8 wherein said switches are reed switches and said activating devices are magnets.

10. The detection circuit of claim 4 wherein said closures comprise safety shields.

11. The detection circuit of claim 4 wherein said indicator is an LED.

12. The detection circuit of claim 4 wherein said energizing circuit is a low voltage DC power supply.

13. The detection circuit of claim 4 wherein said equipment has a plurality of closure members and wherein each of said closure members has an associated encoder and carries a decoder keyed to said associated encoder, said one leg of the bridge circuit comprising a series arrangement of said plurality of encoders.

* * * * *